United States Patent [19]

Dievendorff et al.

[11] Patent Number: 5,452,430
[45] Date of Patent: Sep. 19, 1995

[54] SYSTEM AND METHOD FOR STORING PERSISTENT AND NON-PERSISTENT QUEUED DATA AND FOR RECOVERING THE PERSISTENT DATA RESPONSIVE TO A SYSTEM RESTART

[75] Inventors: Richard Dievendorff; Chandrasekaran Mohan, both of San Jose, Calif.

[73] Assignee: International Business Machines Corporation, Armonk, N.Y.

[21] Appl. No.: 216,897

[22] Filed: Mar. 23, 1994

[30] Foreign Application Priority Data

Mar. 30, 1993 [GB] United Kingdom ............... 9306662

[51] Int. Cl.$^6$ ............................................ G06F 13/00
[52] U.S. Cl. .................... 395/183.13; 364/DIG. 1; 364/DIG. 2; 395/497.01; 395/416
[58] Field of Search ............ 364/DIG. 1 MS File, 364/DIG. 2 MS File; 395/200, 250, 400, 425, 375, 500, 800

[56] References Cited

U.S. PATENT DOCUMENTS 4,638,426 1/1987 Chang et al. ..................... 395/400
4,680,700 7/1987 Hester et al. ..................... 395/400

OTHER PUBLICATIONS

J. Z. Teng and R. A. Gumaer, Managing IBM Database 2 Buffers to Maximize Performance, IBM System Journal, vol. 23, No. 2, pp. 211–218, 1984.

Primary Examiner—Robert B. Harrell
Attorney, Agent, or Firm—P. E. Blair; J. C. Pintner

[57] ABSTRACT

A data processing system for the storage of persistent and non-persistent data in a queue, and a method for the storage of data which is required to survive a system failure (persistent data) and data which is not required to survive a system failure (non-persistent data) on a single queue, are disclosed. The method involves receiving persistent and non-persistent data to be stored in a queue, then marking the data in time sequence order, before storing the persistent data in a first set of data pages and the non-persistent data in a second set of data pages. Upon receiving a request for removal of data from the queue, both the first and second sets of pages are checked and the data is removed in time sequence order. A log is preferably created to enable recovery in the event of failure and restart of the queue. When receiving and removing persistent data to be stored in and to be removed from the queue, log entries are made of changes to the persistent data only. Before the receiving of the data, a table in space map pages is created indicating which pages available in storage are free, which are allocated for persistent data, and which are allocated for non-persistent data. After receiving data and removing data, the table is updated. In the event of a failure and restart of the queue, space map page table is scanned and updated to indicate that all pages containing non-persistent data are free.

7 Claims, 8 Drawing Sheets

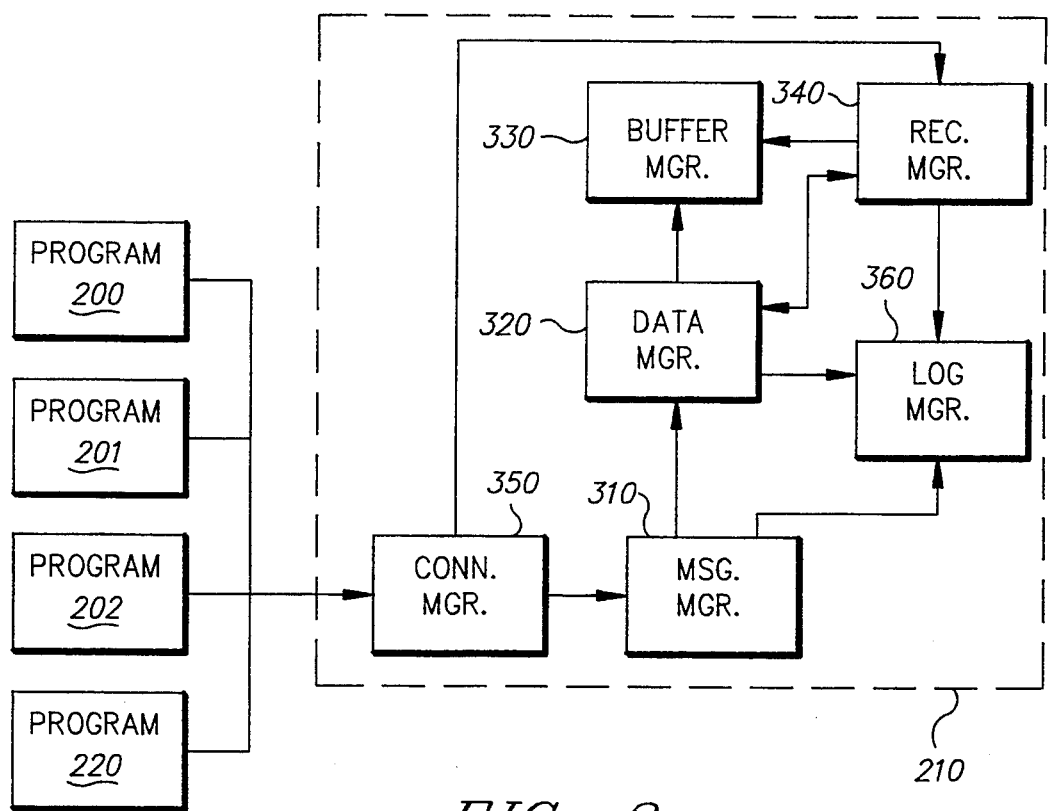
FIG. 3
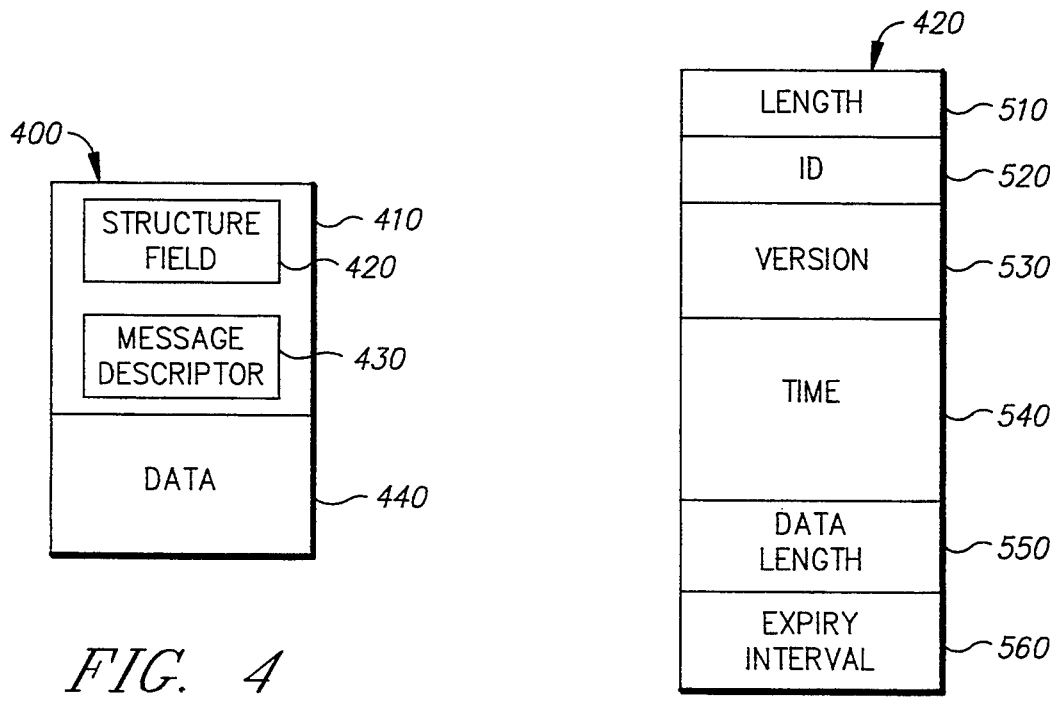
FIG. 4
FIG. 5

SYSTEM AND METHOD FOR STORING PERSISTENT AND NON-PERSISTENT QUEUED DATA AND FOR RECOVERING THE PERSISTENT DATA RESPONSIVE TO A SYSTEM RESTART

FIELD OF THE INVENTION

The present invention relates to communications between programs running on data processing systems, and, in particular, to communications systems and methods using messaging and queuing to store persistent and non-persistent data.

BACKGROUND OF THE INVENTION

Business application data processing frequently involves a group of related programs, each of which handles a single, well defined component of the whole application. Often, the programs that make up a business application run in a single operating system environment such as AIX or OS/2 (AIX and OS/2 are trademarks of IBM Corp.) on a single processor. Sometimes they run in multiple, unlike environments, though still on a single processor.

Many businesses go a step further and distribute programs around a data processing network, rather than run them all on one processor. For example, a single application could be distributed between an AIX/6000 environment on a RISC System/6000 processor and an OS/400 environment on an AS/400 processor. (RISC System/6000, OS/400, AS/400 and AIX/6000 are trademarks of IBM Corp).

There are many advantages in this approach, most of which are related to making better use of resources. It is often a good idea to put a program near to the data it is processing, so that network traffic is kept to a minimum. Load balancing—rescheduling and relocating the workload to complete it as efficiently as possible is another sound reason for distributing an application. Moving an application from one large machine to several smaller machines can also sometimes be a valid reason.

When a single application is distributed, whether to unlike environments on a single processor or to different nodes of a network, a way of enabling each one of the group of related programs forming part of the application to communicate with each other is needed. This can be challenging even when all of the parts are from a single supplier, when there are no variations in the operating systems that are used, when programs are written in a single language and when there is a single communications protocol. When not all of these factors apply, the difficulties in establishing communications between the parts of the application become much greater.

Additionally, one program may only be able to execute while another waits to execute. Even though they may take turns to execute, both programs have to be available to take part in any communications. This conflicts with the desire to be able to run related programs independently of each other.

Three ways in which parts of an application may communicate with each other are conversational communication, calling and messaging. Conversational communication is the most mature and widely used, calling is less widespread and messaging is intensively used in specialised areas.

A conversation is a series of synchronous message exchanges between two partners, both of which remain active for the duration of the conversation. The conversation is analogous to a telephone call.

In calling, a program requests another program to be executed or a procedure to be carried out. The request can be to a local system or to a remote system. The called system runs the requested program or procedure and returns the result in a pre-defined format to the calling program. This is a single two-way exchange of information, analogous to a letter with a reply. Because this process is synchronous, the calling program is suspended while the called program or procedure completes.

Messaging is asynchronous and uses the concept of packets of information that are routed to specified destinations. The routed packets contain information about work to be done, or the results of work which has been done. Queuing is a key component of most messaging implementations and allows great flexibility as to when, where, and how work is accomplished. Programs which use messaging are not logically connected as they would be if they were using calling or conversational communication. They are indirectly associated through one or more queues. A message is communicated by one program placing it on a queue from which the other removes it. After processing, the receiving program may generate a message to be returned to the sending program or forwarded to another program. There is no private, dedicated, logical connection to link the programs.

In order to implement messaging, support programs known as queue managers are established at each node of the network to manage queued messages. Cross-network communication sessions are established between queue managers rather than between individual programs. If a link between processors fails, the queue manager recovers from the failure. Programs on the affected processors are not brought to a halt by such an event. In fact, they need not even be aware that it has happened. The data contained within a message can be valuable and protection of this data can be essential. For this reason, messages may not be deleted from queues at one end of a link until they are received at the other end of the link.

Messages may be declared "persistent" (or non-volatile), so that the queue manager can recover them, for example, from disk storage, after a failure of the system on which the queue manager is running. However this carries with it a significant overhead. For messages that are easily regenerated or which have a limited time during which their transmission may be useful, for example, a request from an automated teller machine for a balance of an account, this persistence is unnecessary and so such messages are declared "non-persistent" (or volatile). No actions are taken to recover them after a system failure of the queue manager. In addition, any that are recovered after such a system failure may be discarded by the queue manager.

Conventionally, two queues are maintained, one for persistent and one for non-persistent messages. In normal operation, it is necessary for the queue manager to select messages from each queue for processing. This may result in messages relating to the same program, but stored on two separate queues, not being processed in the order in which they were received, and so cause delay in normal processing of messages. It also requires programs to deal with two queues instead of one for logically related data.

Several queuing systems (e.g., IBM's Queued Telecommunications Access Method (QTAM), Telecommunications Access Method (TCAM), Information Management System (IMS), and Customer Information Control System (CICS)) provide facilities for queued data. (IBM and CICS are trademarks of IBM Corp.). These systems support persistent and non-persistent queues but not a mixture of persistent and non-persistent messages on the same queue.

Teng describes the IBM DATABASE 2 Buffer Manager in "Managing IBM DATABASE 2 buffers to maximize performance" in IBM Systems Journal, Vol 23, number 2, 1984. (DATABASE 2 is a trademark of IBM Corp.). IBM DATABASE 2 supports recoverable and non-recoverable files on disk but does not support mixing non-persistent and persistent elements within the same file on disk.

Messages that are declared persistent and messages that are declared non-persistent could be stored in the same queue. When the system is restarted after a system failure the queue would be scanned and each message checked to see if it were persistent or non-persistent. Those that were marked non-persistent would be discarded and those that were persistent would be replaced in the queue. This method has the disadvantage that the scanning step would take a considerable period of time and so result in a delay in the system being available after a restart.

It is desirable to provide a mechanism that does not require separate queues for persistent and non-persistent messages and does not require scanning of the single queue when the system is restarted with the consequent delay in availability of the system.

SUMMARY OF THE INVENTION

It is a primary object of the present invention to provide a system and method which does not require separate queues for persistent and non-persistent messages and which does not require scanning of the single queue when the system is started, thus avoding the consequent delay in availability of the system.

To achieve the objects of the present invention, a system and method for the storage of persistent and non-persistent data arranged as a queue is disclosed. The present method involves receiving persistent and non-persistent data to be stored in a queue, then marking the data in time sequence order before storing the persistent data in a first set of pages of the queue and the non-persistent data in a second set of pages of the queue. Upon receiving a request for removal of data from the queue, both the first and second sets of pages are checked, and the data is removed in time sequence order.

Preferably, the method includes allocating storage for the first and second sets of pages, creating first and second lists of pages corresponding to the first and second sets of pages, and updating the first and second lists after the steps of storing or removing data.

A log is preferably created to enable recovery in the event of failure and restart of the queue. When receiving and removing persistent data to be stored in and to be removed from the queue, respectively, entries are made in the log of changes to the persistent data only. Before the step of receiving data, a table of space map pages is created, indicating which pages available in storage are free, which are allocated for persistent data, and which are allocated for non-persistent data. After receiving data and removing data, the space map page table is updated. In the event of a failure and restart of the queue, the space map page table is scanned and updated to indicate that all pages containing non-persistent data are free.

A data processing system for the storage of persistent and non-persistent data in a queue is also disclosed having a data manager for allocating one or more pages of storage for storing persistent data, one or more pages of storage for storing non-persistent data, means for pointing to the pages storing persistent data and to the pages storing non-persistent data thereby to define a queue, connection management means for receiving persistent and non-persistent data to be stored and for receiving requests for the removal of data, and message management means for storing the received persistent and non-persistent data in respective pages of the pointing means and for time-stamping the data as it is stored in time sequence order.

Preferably, the log means comprises entries made when persistent data is received or removed from the queue and recovery management means for restoring the contents of the queue in the event of a system failure by refernce to the log means. It further comprises a table having an entry for each page of storage. The entry indicates whether the page of storage is free, allocated to persistent data, or allocated to non-persistent data. In the event of a failure and restart of the queue, the recovery management means scans and changes all entries in the table which indicate that a page of storage is allocated to non-persistent data to indicate that those pages of storage are free.

Additional objects and advantages of the prsent invention will be set forth in the description which follows and, in part, will be obvious from the description or may be learned by the practice of this invetnion. The objects and advantages of this invention as described herein may be realized and obtained by means particularly pointed out and distinctly claimed in the appended claims taken in conjunction with the accompanying drawings and detailed specification.

BRIEF DESCRIPTION OF THE DRAWINGS

In order to further understand the present invetnion disclosure and claimed herein, the following drawings are provided, in which:

FIG. 3 is a block diagram of a queue manager such as that shown in FIG. 2;

FIG. 4 is a diagram of the contents of a message used in the queue manager of FIG. 3;

FIG. 5 is a diagram showing the contents of a structured field, such as that shown in the message of FIG. 4;

DETAILED DESCRIPTION OF THE PREFERRED EMBODIMENT

The present invention is directed to communications systems and methods using messaging and queueing to store persistent and non-persistent data.

Figure 1:
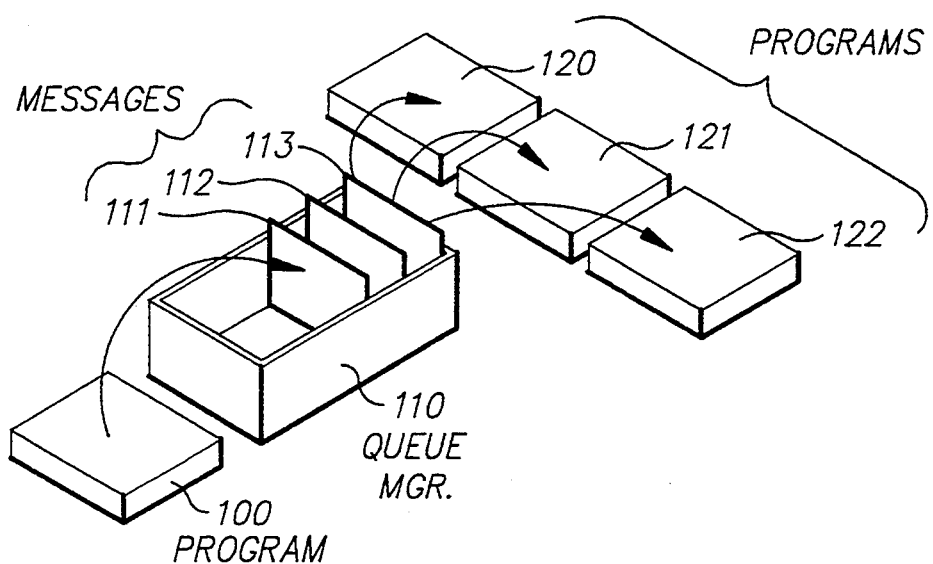
FIG. 1 is a diagram showing a queue manager with a one-to-many relationship between programs.

FIG. 1 shows a queue manager 110 which accepts messages 111, 112, 113 put onto a queue by one program 100. Programs 120, 121, 122 get messages 111, 112, 113 from the queue manager 110. This queue manager 110 has a one-to-many relationship between programs 100, 120, 121, 122.

Figure 2:
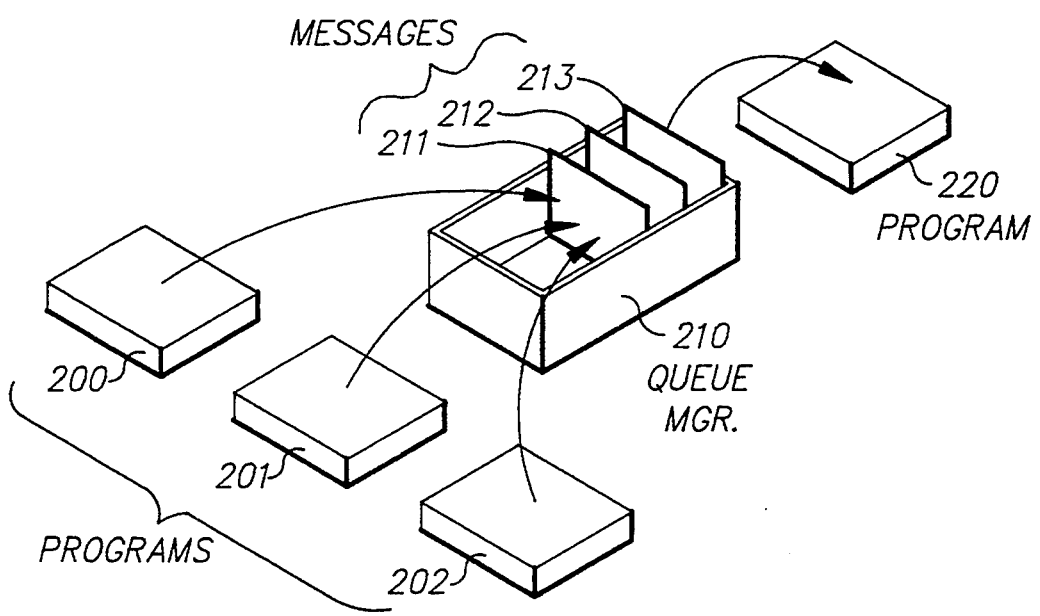
FIG. 2 is a diagram showing a queue manager with a many-to-one relationship between programs.

FIG. 2 shows a queue manager 210 which accepts messages 211, 212, 213 put onto the queue by more than one program 200, 201, 202. Program 220 gets messages 211, 212, 213 from the queue manager 210. This queue manager 210 has a many-to-one relationship between programs 200, 201, 202, 220. A message 211 comes into existence when it is passed to a local queue manager 210 by the sending program 200. The message 211 ceases to exist when the receiving program 220 removes the message 211 from the queue.

FIG. 3 shows the main components of the message queue manager 210. 200, 201, 202, 220 are the programs referenced in FIG. 2. These communicate with the queue manager 210 via the queue manager's Connection Manager 350 which passes information concerning additions to and removals from a queue to a Message Manager 310 and information concerning successful completion or backout of a transaction which includes the message to a Recovery Manager 340. The Recovery Manager 340 coordinates interactions between resource managers (not shown) and steps the resource managers through any two phase commit protocol in which they participate. A resource manager is the combination of data, code and processes that provide access to some shared data. The Recovery Manager 340 also controls the restart process. A Data Manager 320 controls the accessing of data within pages in a data store, and performs locking, logging to a Log Manager 360 and storage management functions. A Buffer Manager 330 controls movement of pages of data between auxiliary (DASD) storage and virtual storage in response to requests from the Data Manager 320. The Log Manager 360 maintains an ever increasing sequence of log records containing information on updates, deletions and insertions to the queue for use in recovery after a system failure.

A message queue is just an area of storage set aside by the queue manager 210 to hold messages on their way from one program to another. Queues may be implemented in main storage or on a direct access storage device (DASD). Messages are put on a queue by one or more programs, and retrieved from it also by one or more programs.

FIG. 4 shows the contents of a message 400 consisting of two parts, a message header 410 (which includes a structured field 420 and a message descriptor 430) and application data 440. The structured field 420 of the message header 410 is used to hold a description of the message being put to, or the message being retrieved from, the queue. The structured field 420 is described with reference to FIG. 5. The structured field is not accessible to the sending program 200, 201, 202 or to the receiving program 220. The message descriptor 430 is passed by the sending program 200, 201, 202 to the queue manager 210. The queue manager 210 gives the message descriptor 430 to the receiving program 220.

The message descriptor 430 contains information including the priority and persistence of the message.

Some messages may be more important than others. To allow the sender of a message to indicate its importance relative to other messages, each message has a priority that can be set by the sender. The receiver of a message does not have to accept the assigned priority, and if the destination queue is defined as First In First Out (FIFO), the queue manager ignores the priority.

Sometimes the sender of a message wants to assure that a message will be delivered even if there is a failure of, for example, the queue manager 210; this property of a message is called persistence. A persistent message is protected against system failures, and survives until it is retrieved by the receiving program. This aspect of the message descriptor will be described later.

Application data 440 in a message 400 is defined and supplied by the program 200, 201, 202 which sends the message 400. There are no constraints on the nature of the data in the message 400; for example, it could consist of one or more of the following types: character strings, bit strings, binary integers, packed decimal integers and floating point numbers.

FIG. 5 shows the contents of the structured field 420 of the message header 410. The length 510 is the length of the structured field part 420 of the message header 410, the ID 520 indicates that this is a message header type of structured field and is set to 0001 in the present implementation. The version number 530 indicates the version of queue manager 210 which created this structured field, and hence how the contents should be interpreted. A clock value 540, representative of the time, is stored to enable retrieval of messages in time sequence order. Data length 550 is the length of application data 440. Expiry interval 560 is used to allow deletion of messages which have a limited lifetime at the end of their lifetime.

A program puts a message on to a queue by specifying information about the message to be put (message descriptor 430), the length of the message data 440 and the message data 440 itself. A program gets a message from a queue by specifying some of the information about the message to be got (message descriptor 430), an empty buffer and the length of that buffer. It receives in return the message data in the buffer and the total length of the message data. The message descriptor 430 is completed with information about the message just retrieved such as its length.

Figure 6:
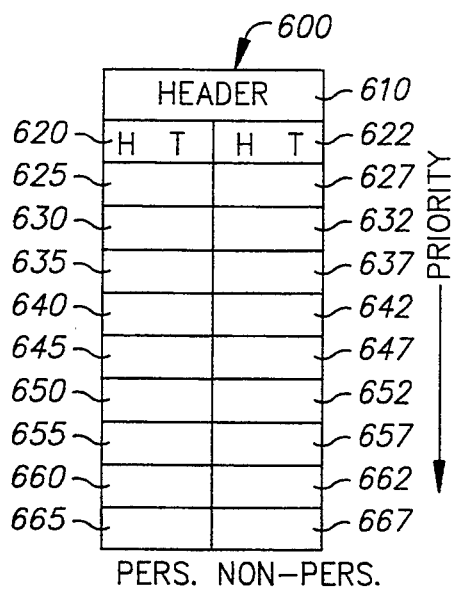
FIG. 6 is a diagram of a queue used in the storage of messages such as those of FIG. 4.

FIG. 6 shows a queue 600 represented logically by multiple pairs of lists such as lists 620, 622 of pages, pages in one list 620 containing messages which are marked as persistent (in time sequence order), pages in the other list 622 containing messages which are marked as non-persistent (also in time sequence order). A given page contains only persistent or only non-persistent messages.

Figure 7:
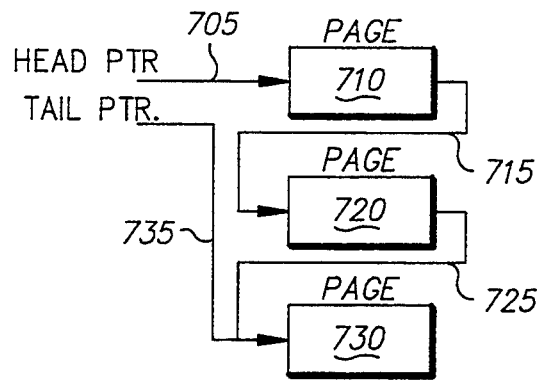
FIG. 7 is a diagram showing a list of linked pages used in the queue of FIG. 6.

The lists 620, 622 actually contain two pointers each, which will be described with reference to FIG. 7. A head pointer 705 points to the head of a set of pages 710, 720, 730 which are linked together by further pointers 715, 725. A tail pointer 735 points to the tail of that list.

To retrieve messages from the top of a queue, both the persistent 620 and non-persistent 622 lists of pages are examined, and messages are presented in time sequence order. As described earlier with reference to FIG. 4, some messages may be more important than others and the sender of a message can indicate its importance relative to other messages by means of allocating it a priority from 0 to 9. Each priority level has its own lists of linked pages, one list for persistent messages and one for non-persistent messages. When messages are removed from the queue, messages in the list of the highest priority messages are removed first in time sequence order until all persistent and non-persistent messages in the list of highest priority messages have been removed, followed by messages of the next highest priority. This continues until no messages are left on the queue. These lists are shown at 625 to 667 in FIG. 6.

Figure 8:
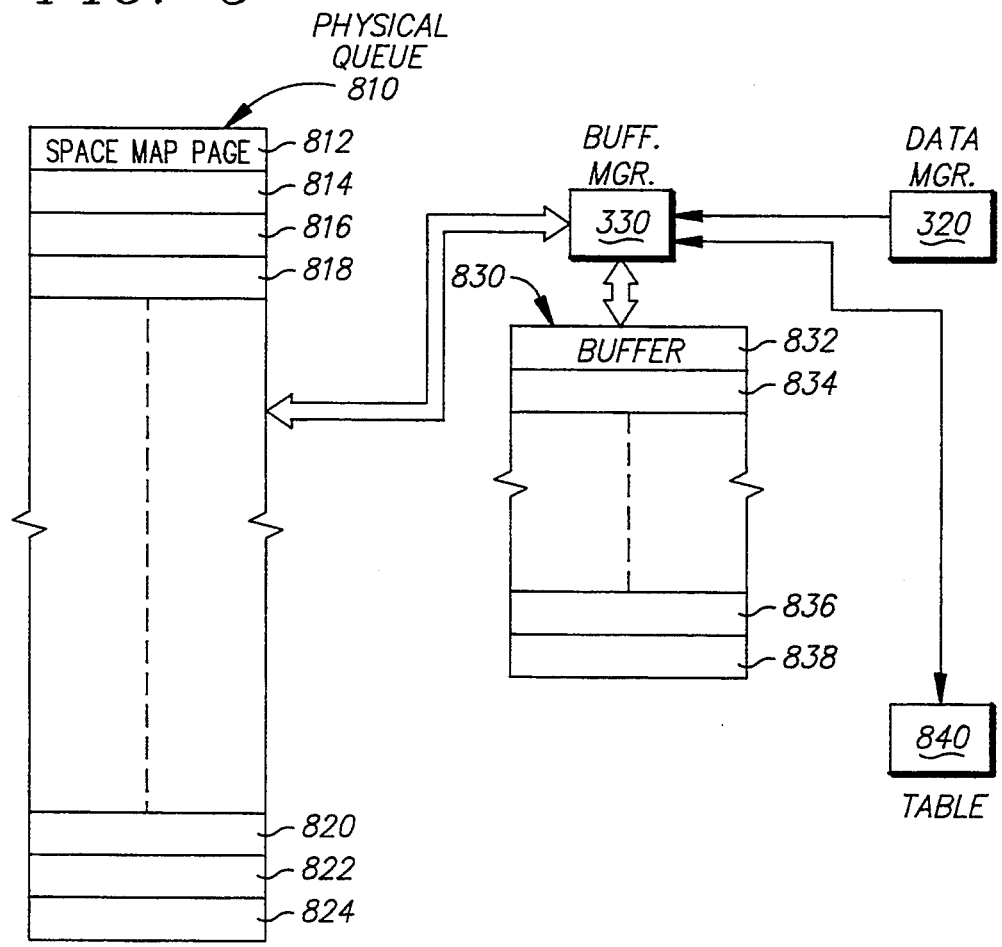
FIG. 8 is a diagram of a queue such as that of FIG. 6 stored as a file on disk.

FIG. 8 shows a physical queue 810 stored in a single file on disk. The queue is stored as a number of pages 812 to 824 on the disk. The number of pages used on disk to represent the queue may be, for example, ten thousand. To allow faster access to the pages making up the queue a copy of some of the more frequently referenced pages is kept in buffers 832 to 838 in virtual storage, that is generally in memory. The number of buffers 832 to 838 available may be, for example, fifty. The Buffer Manager 330 uses a table 840 to keep track of what pages are stored in the buffers 832 to 838. The Buffer Manager 330 minimises the number of actual disk accesses required to supply to the Data Manager 320 data that it requests.

A data page, which is stored in a buffer 832 to 838, which has changes that have not been committed may be written to disk by the Buffer Manager 330 if that page has not been recently referenced by the Data Manager 320. This is called a "steal" policy, because pages are written (stolen) from the buffer even if the pages are still being actively changed. A steal policy implies that these pages must have changes undone in the event of failure of the system.

A data page, which is stored in a buffer 832 to 838, which has changes that have been committed or has had messages inserted or deleted, may still not be written to disk by the Buffer Manager 330 if that page is still one of the pages being recently referenced. Only if it becomes one of the less recently referenced pages will it be written to disk. This is called a "no-force" policy, because the Buffer Manager 330 is not forced to write the page to disk, even when the changes have been committed. A "no-force" policy implies that these pages must have the changes redone in the event of failure of the system.

To assure that messages which are within the queue manager 210 when a failure occurs in the queue manager 210 are recovered, the queue manager 210 records via a Log Manager 360 in a "recovery log" any changes that are made to the buffers 832 to 838 or to the queue on disk. The recovery log becomes the source for ensuring that the committed actions which were not written from the buffer copy to the disk copy are redone after a failure and that uncommitted actions that were written from the buffer copy to the disk copy are undone.

Actions which alter the contents of the queue are reflected in the log by UNDO and REDO records. An UNDO log record allows restoration of the contents of the queue before an altering action was made. A REDO log record allows restoration of the contents of the queue after the change was made. If an uncommitted change was written to the queue on disk, then it can be undone. If a committed change was not written to the queue on disk, then it can be redone.

If the contents of a queue were lost due to media failure, it would be possible to recreate the queue if all REDO log records since the queue was created were saved and available. A nonvolatile copy of the queue could be made periodically and saved, and the log position at the time the copy was made could be noted. Then, if a failure occurs, the recovery log could be processed from the noted position.

Instead a "checkpoint" is initiated based on the passage of time, or on the amount of activity being handled by the system. The data within the most recent checkpoint serves as resource manager initialising information in the event of a restart. The checkpoint's purpose is to minimise the amount of log information that must be read and processed during restart.

The Buffer Manager writes to disk very frequently referenced buffers containing persistent messages even if the buffer is not "Least Recently Used" whilst retaining the information in the buffer.

In the preferred embodiment, a specific type of log, known as a Write Ahead Log (WAL) is used. In a Write Ahead Log (WAL), an updated page is written back from a buffer to the same nonvolatile storage (e.g. disk) location from where it was read. Log records representing the changes to the data must be written to nonvolatile storage before the changed data is updated on the non-volatile storage. Otherwise, in the event of a restart, the log records would be inconsistent with changed data on non-volatile storage.

The Buffer Manager assures that the log record describing the most recent change to a page is physically written to the log before the page is written to the disk file. In the embodiment of the present invention, log records are only written for persistent data, not for non-persistent data. The pages containing non-persistent data will not be recovered in the event of a restart, and so there is no reason to write log data for these pages.

When a page is updated a log sequence number is allocated to the log entry. Fields, which are described below in Table 1, are then written to the log by the Log Manager to allow recovery.

TABLE 1

| Contents of a log record | |
|---|---|
| Fields in a log record | |
| LSN | Log Sequence Number - usually the first byte of the log record in the log address space. This is not a field in the log record as such, but merely the address where the first field (Type) can be found. |
| Type | Indicates the type of record, for example, UNDO, REDO, UNDO AND REDO, CHECKPOINT. |
| Subtype | Qualifies the record types, for example, INSERT, DELETE, CHANGE, ALLOCATE PERSISTENT PAGE, ALLOCATE NONPERSISTENT PAGE, DEALLOCATE PERSISTENT PAGE, DEALLOCATE NONPERSISTENT PAGE, BEGIN BACKOUT, END BACKOUT |
| RMID | Identifier of the resource manager that wrote the log record. |
| TransID | Identifier of the transaction that wrote the log record. |
| PrevLSN | Address of the preceding log record written by the same application. |
| Length | Length of the log record including the header information. |
| Data | This is the redo and/or undo data that describe the action that was performed. The information here would also be used to determine the appropriate action routine to be used to perform the redo and/or undo of this log record. |

Within each file on disk representing a queue 810 is at least one page used as a space map page 812. This represents the status of a quantity of pages which follow the space map page. Typically, this quantity is 16,000 pages.

In the present embodiment, a pair of bits is used to represent each of the pages. Referring to FIG. 8, the page 812 is a space map page representing the status of pages 814 to 824. The first two bits of data within page 812 represent the status of page 814, the second two bits the status of page 816 and so on. These bits indicate whether a page is free, allocated to a persistent page or allocated to a non-persistent page. A fourth combination of bits is invalid.

Space management actions for pages containing non-persistent messages need not be logged because all pages containing non-persistent messages are freed at restart. Separate counts of non-persistent and persistent messages are maintained for each queue. Log records are written for updates to the persistent element count. No log records are written for updates to the non-persistent element count. The queuing system presents the sum of these two counts as the current queue depth.

When the queuing system is shut down normally, the Buffer Manager 330 writes to disk the contents of all changed buffers containing persistent messages. Pages containing non-persistent messages are not written during shutdown.

After a failure of the queue manager 210, restart processing is initiated. Any space map pages are scanned and all those pages marked as allocated to non-persistent pages are freed, so that time is not spent on trying to recover these pages. The individual data pages themselves need not be accessed to determine whether they contain non-persistent or non-persistent data.

Log records are scanned from the position in the log of the last checkpoint towards the most recent entry in the log looking for REDO type records. Data which was changed by actions which completed before the failure occurred will not be changed by the effect of the REDO log records. Changes which had not been saved to the persistent copy, but which had been committed, will be applied using the information in the REDO log records. When all the changes which were committed, but not saved to disk (a consequence of the no-force policy) have been made, the log is scanned from the most recent entry in the log backwards towards the position in the log of the last checkpoint. Changes which had been saved to the persistent copy, but which had not been committed, since the last checkpoint will be removed using the information in the UNDO log records. When all the changes which were not committed, but saved to disk (a consequence of the steal policy) have been made, recovery is complete.

A method for the storage of persistent and non-persistent data arranged as a queue in accordance with the invention is now presented with reference to flowcharts in FIGS. 9, 10, 11, 12, and 13.

Figure 9:
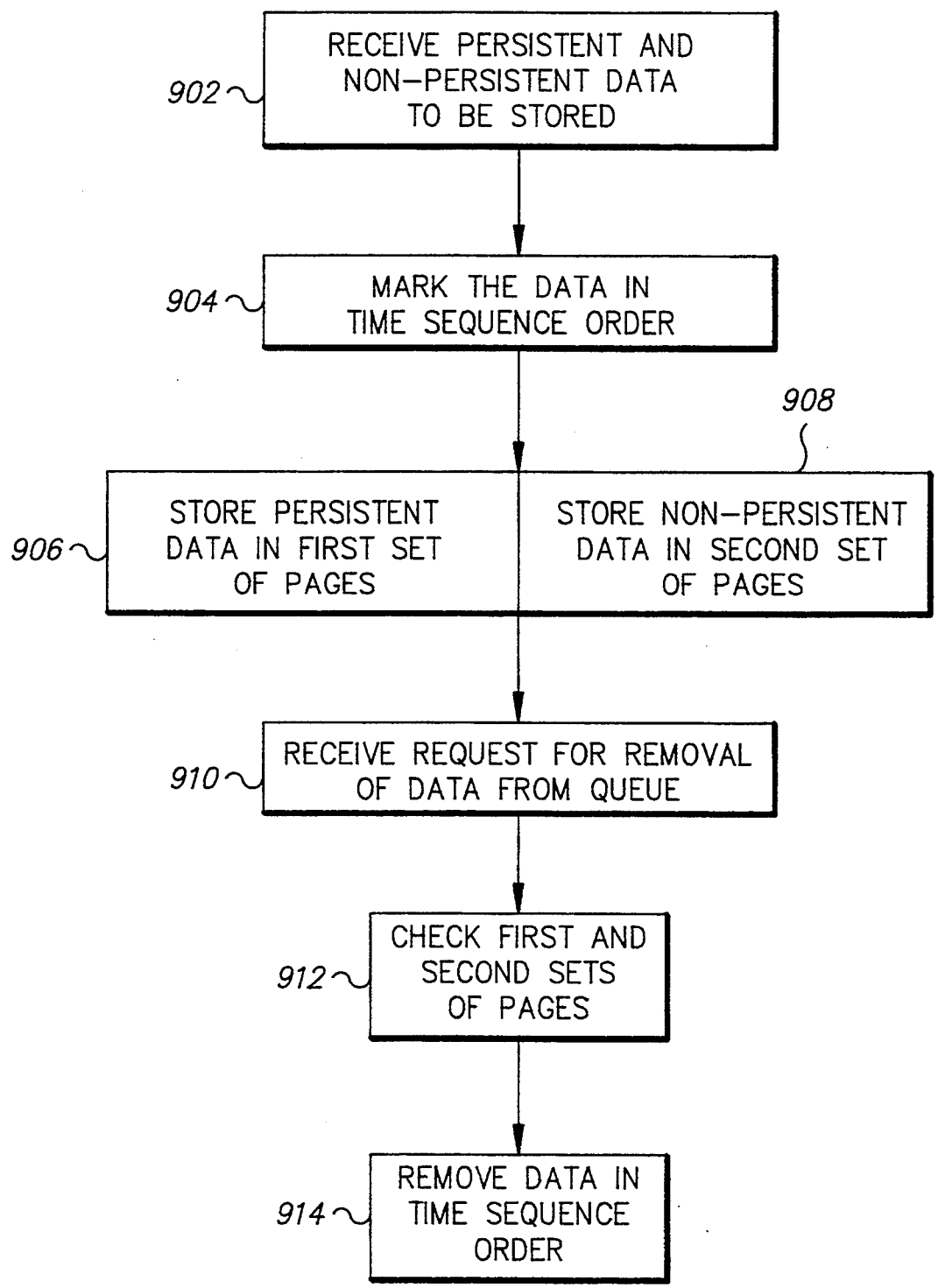
FIGS. 9, 10, 11, 12, and 13 are diagram of the method implemented in the invention.

Referring to FIG. 9, the method includes receiving persistent and non-persistent data to be stored in a queue (step 902), then marking the data in time sequence order (step 904) before storing the persistent data in a first set of pages (step (906), and storing the non-persistent data in a second set of pages (step 908). Upon receiving a request for removal of data from the queue (step 910), both the first and second set of pages are checked (step 912), and the data is removed in time sequence (step 914).

Figure 10:
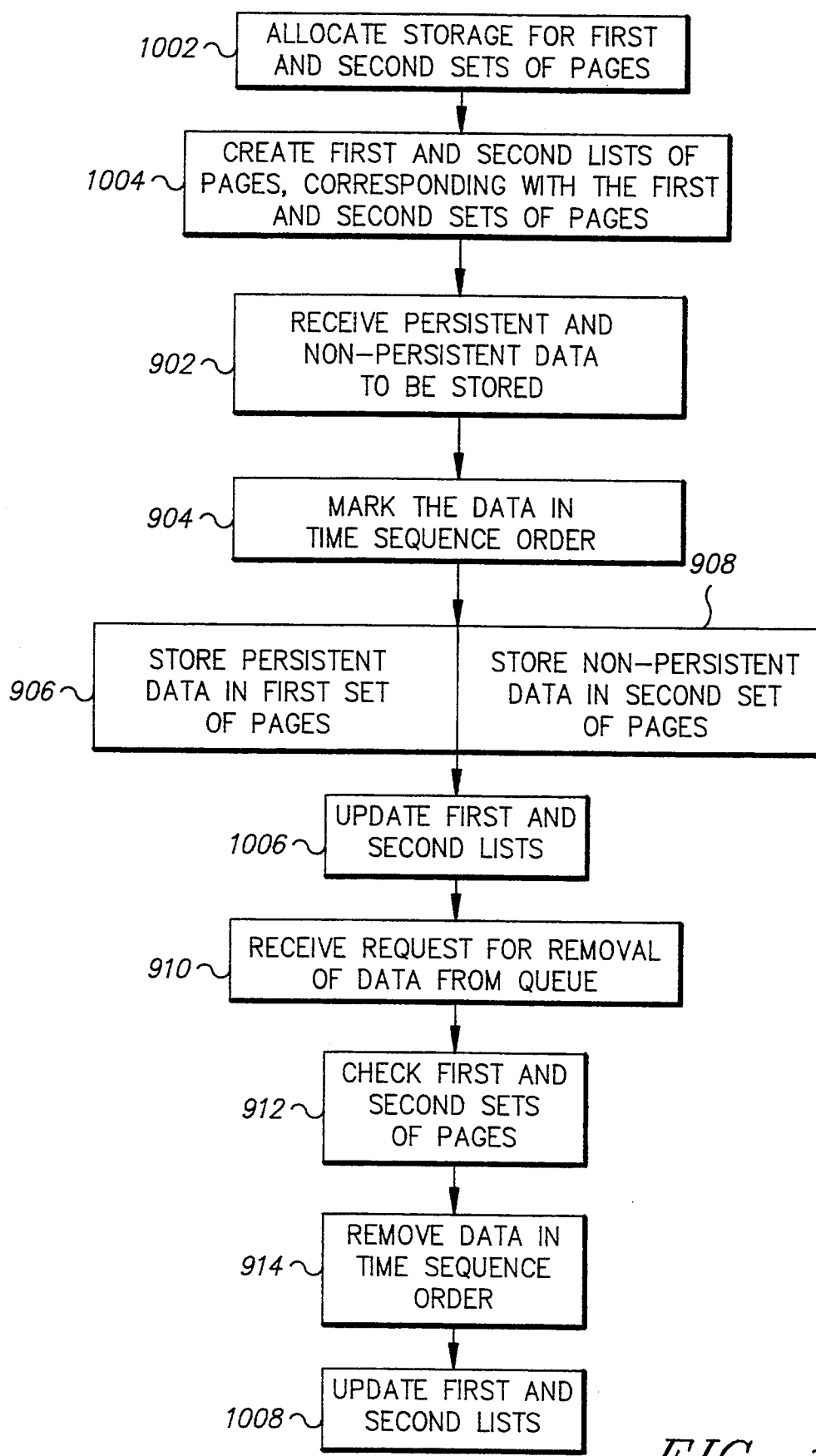

Referring now to FIG. 10, the method preferably includes allocating storage for the first and second set of pages (step 1002), creating first and second lists of pages corresponding to the first and second sets of pages (step 1004), and updating the first and second lists (steps 1006 and 1008, respectively) after the steps of storing or removing data (steps 906 and 908, and step 914, respectively).

Figure 11:
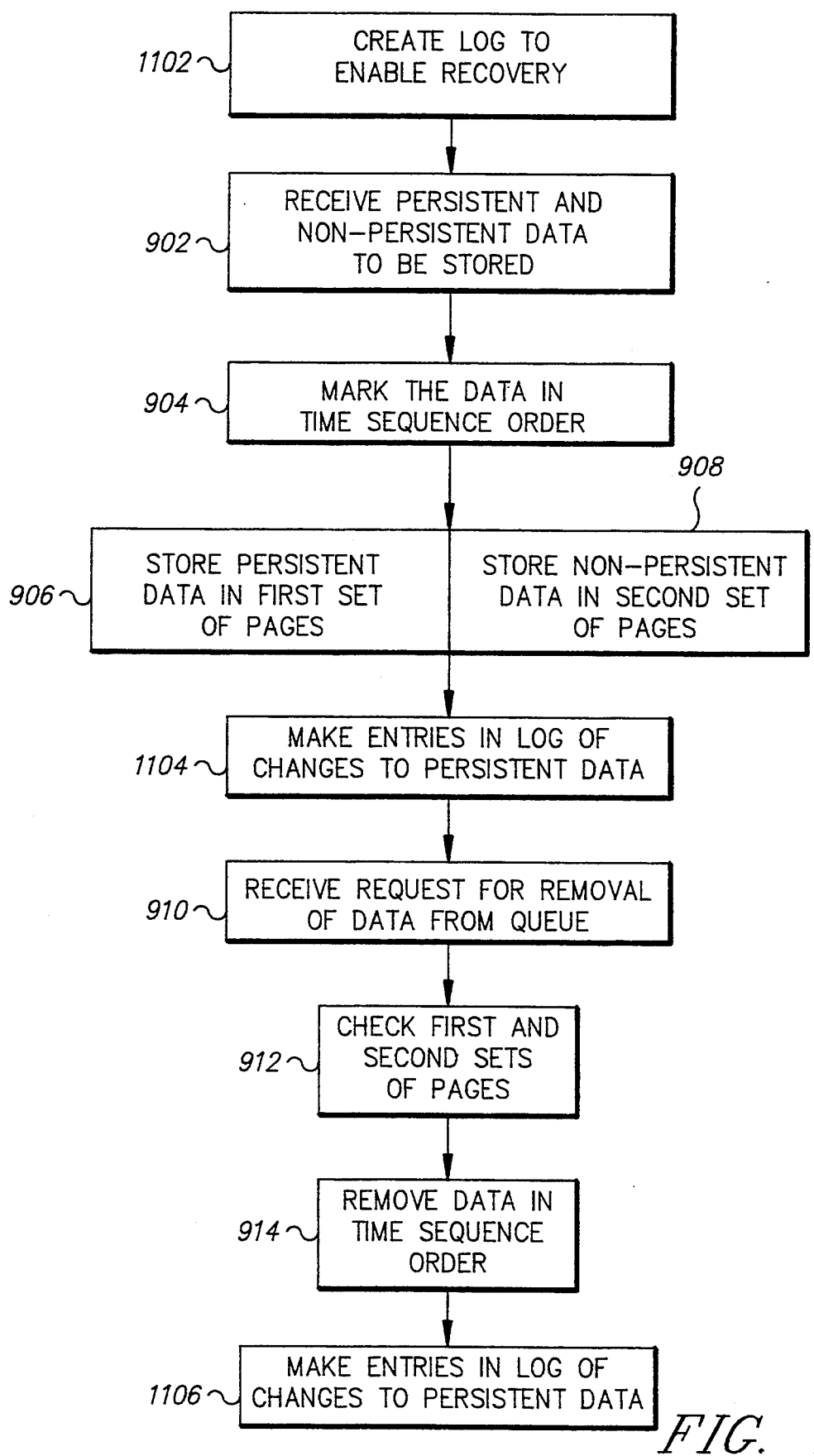

Referring now to FIG. 11, a log is preferably created to enable recovery in the event of failure and restart of the queue (step 1102). When receiving and removing persistent data to be stored in and to be removed from the queue, respectively, entries are made in the log of storing and removing the persistent data only (step 1104).

Figure 12:
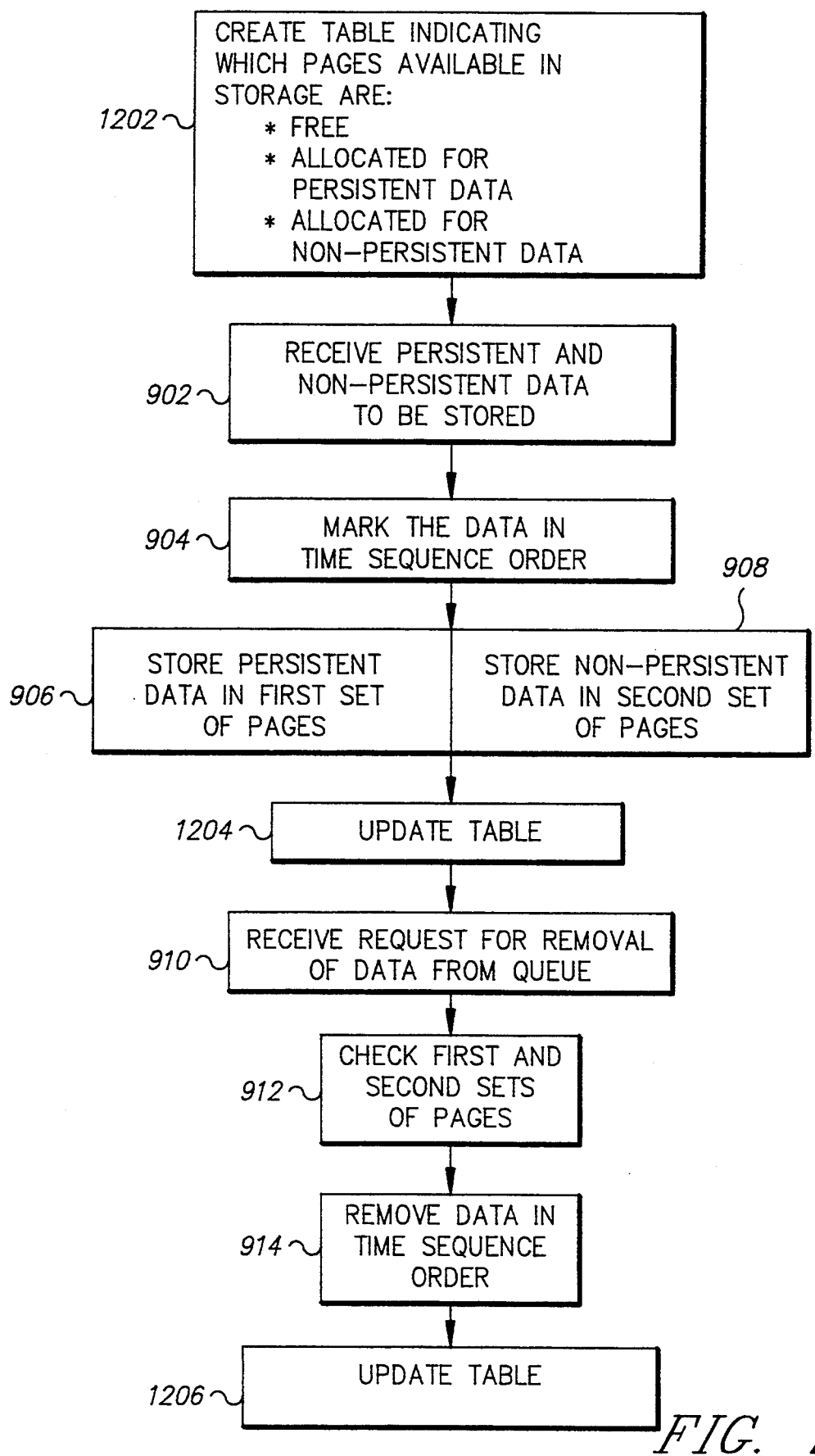

Referring now to FIG. 12, before the step of receiving data (step 902), a table is created indicating which pages available in storage are free, which are allocated for persistent data, and which are allocated for non-persistent data (step 1202). After receiving data and removing data, the table is updated (steps 1204 and 1206, respectively).

Figure 13:
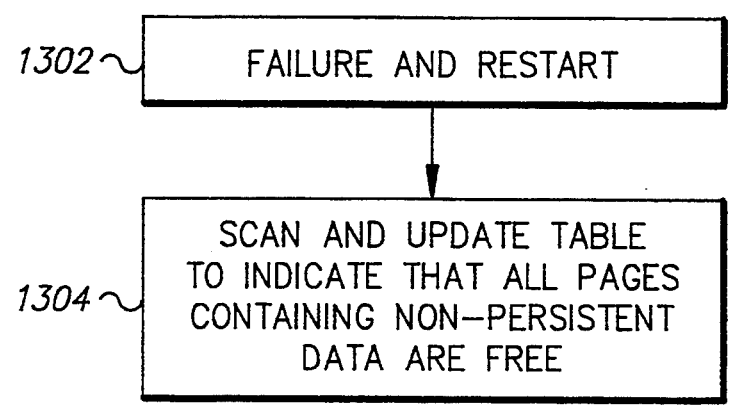

Referring to FIG. 13, in the event of a failure and restart of the queue (step 1302), the table is scanned and updated to indicate that all pages containing non-persistent data are free (step 1304).

A data processing system for the storage of persistent and non-persistent data in a queue is also disclosed having a data manager for allocating one or more pages of storage for storing persistent data, one or more pages of storage for storing non-persistent data, means for pointing to the pages storing persistent data and to the pages storing non-persistent data thereby to define a queue, connection management means for receiving pesistent and non-persistent data to be stored and for receiving requests for the removal of data, and message management for storing the received persistent and non-persistend data in respective pages of the pointing means and for making the data as it is stored in time sequence order.

Preferably, the system according to the invention includes log means comprising entries made when persistent data is received or removed from the queue and recovery management means for restoring the contents of the queue in the event of a system failure by reference to the log means. It further comprises a table having an entry for each page of storage. The entry indicates whether the page of storage is free, allocated to persistent data, or allocated to non-persistent data. In the event of a failure and restart of the queue, the recovery management means scans and changes all entries in the table which indicate that a page of storage is allocated to non-persistent data to indicate that those pages of storage are free. The present invention does not require separate queues for persistent and non-persistent messages and does not require scanning of the single queue when the system is restarted with the consequent delay in availability of the system.

This invention may be embodied in other specific forms without departing from its spirit or essential characterisitics. The above-described embodiments of the present invention are to be considered in all respects only as illustrative and not restrictive in scope The scope of the invention is, therefore, indicated by the appended claims rather than by the above-detailed description. Therefore, all changes which come within the meaning and range of equivalency of the claims are to be considred embraced within their scope.

What is claimed and desired to be secured by United States Letter Patent is:

1. A method for storing persistent and non-persistent data in a queue, the method comprising the steps of:

(a) receiving persistent and non-persistent data to be stored in the queue;

(b) marking the persistent and non-persistent data in time sequence order:

(c) storing said persistent data in a first set of pages and said non-persistent data in a second set of pages;

(d) on receiving a request for removal of the persistent and non-persistent data from said queue, checking both first and second sets of pages; and (e) removing the persistent and non-persistent data in time sequence order.

2. A method as defined in claim 1 further comprising the steps of:

(a) allocating storage for said first and second sets of pages;

(b) creating first and second lists of pages corresponding to said first and second sets of pages; and (c) updating at least one of said first and second lists of pages after said steps of storing and removing the persistent and non-persistent data.

3. A method as defined in claim 1 further comprising the steps of:

(a) creating a log of changes to enable recovery following a failure and restart of the queue; and (b) responsive to the steps of receiving and removing persistent data to be stored in and to be removed from the queue, respectively, making entries, in said log, of storing and removing the persistent data only.

4. A method as defined in claim 1 further comprising the steps of:

(a) before the step of receiving said persistent and non-persistent data, creating a table indicating which pages of the first and second sets of pages available in storage are free, which are allocated for persistent data and which are allocated for non-persistent data;

(b) after the step of receiving said persistent and non-persistent data, and after the step of removing said persistent and non-persistent data, updating said table; and (c) responsive to a failure and restart of the queue, scanning and updating said table to indicate that all pages therein containing non-persistent data are free.

5. A data processing system for storage of persistent and non-persistent data in a queue, the data processing system comprising:

(a) a data manager for allocating storage space in a storage system for storing persistent data data, the storage space for storing persistent data including a plurality of pages of storage space;

(b) storage space in the storage system for storing non-persistent data, the storage space for storing non-persistent data including a plurality of pages of storage space;

(c) means for pointing to the pages for storing persistent data and to the pages for storing non-persistent data, thereby to define a queue;

(d) connection management means for receiving persistent and non-persistent data to be stored and for receiving requests for removal of data; and (e) message management means for storing the persistent and non-persistent data received by the connection management means in respective pages of said means for pointing and for marking said data as said data is stored in time sequence order.

6. A data processing system as defined in claim 5 further comprising;

(a) log means comprising entries made when persistent data is received or removed from the queue; and (b) recovery management means for restoring queue to a previous state responsive to a system failure, by reference to said log means.

7. A data processing system as defined in claim 6 further comprising:

(a) a table having respective entry for each respective one of the pages of storage, each respective entry indicating whether said respective page of storage is free, allocated to persistent data, or allocated to non-persistent data;

the recovery management means includes means, operable responsive to a failure and restart of the queue, for scanning and changing all entries in the table which indicate that a page of storage is allocated to non-persistent data, to indicate that those pages of storage are free.

* * * * *

UNITED STATES PATENT AND TRADEMARK OFFICE
CERTIFICATE OF CORRECTION

PATENT NO. : 5,452,430
DATED : Sep. 19, 1995
INVENTOR(S) : R. Dievendorff and C. Mohan It is certified that error appears in the above-indentified patent and that said Letters Patent is hereby corrected as shown below:

Column 12, line 7 (line 5 of claim 5), change "data data" to --data--.

Column 12, line 30 (line 6 of claim 6), change "restoring queue" to --restoring the queue--.

Column 12, line 35 (line 3 of claim 7), change "having respective" to --having a respective--.

Signed and Sealed this

Twelfth Day of March, 1996

Attest:

BRUCE LEHMAN

Attesting Officer    Commissioner of Patents and Trademarks